(12) United States Patent
Mendiratta et al.

(10) Patent No.: US 8,635,315 B2
(45) Date of Patent: Jan. 21, 2014

(54) METHOD AND SYSTEM FOR DYNAMIC LOADING OF MANAGEMENT INFORMATION BASES ON NETWORK DEVICES

(75) Inventors: Rohit Mendiratta, Bangalore (IN); Narayana Pai Hosdurg, Bangalore (IN); Anirban Karmakar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1240 days.

(21) Appl. No.: 11/501,628

(22) Filed: Aug. 9, 2006

(65) Prior Publication Data

US 2008/0040467 A1 Feb. 14, 2008

(51) Int. Cl.
*G06F 15/173* (2006.01)

(52) U.S. Cl.
USPC .......................................................... 709/223

(58) Field of Classification Search
USPC .......................................................... 709/223
See application file for complete search history.

(56) References Cited

U.S. PATENT DOCUMENTS

| | | | | |
|---|---|---|---|---|
| 5,913,037 A | * | 6/1999 | Spofford et al. | 709/226 |
| 6,008,805 A | * | 12/1999 | Land et al. | 715/744 |
| 6,176,883 B1 | * | 1/2001 | Holloway et al. | 709/223 |
| 6,219,703 B1 | * | 4/2001 | Nguyen et al. | 709/224 |
| 6,292,829 B1 | * | 9/2001 | Huang et al. | 709/223 |
| 6,389,464 B1 | * | 5/2002 | Krishnamurthy et al. | 709/220 |
| 7,099,931 B2 | * | 8/2006 | Da Palma et al. | 709/220 |
| 7,433,944 B2 | * | 10/2008 | Kanada et al. | 709/223 |
| 7,480,917 B2 | * | 1/2009 | Richmond et al. | 719/313 |
| 2001/0004745 A1 | * | 6/2001 | Villalpando | 709/223 |
| 2002/0188568 A1 | * | 12/2002 | Nickolaisen et al. | 705/52 |
| 2003/0021283 A1 | * | 1/2003 | See et al. | 370/401 |
| 2003/0101252 A1 | * | 5/2003 | Lacey, III | 709/223 |
| 2003/0115313 A1 | * | 6/2003 | Kanada et al. | 709/223 |
| 2003/0208480 A1 | * | 11/2003 | Faulkner et al. | 707/3 |
| 2003/0229688 A1 | * | 12/2003 | Liang | 709/223 |
| 2004/0236759 A1 | * | 11/2004 | Young | 707/100 |

OTHER PUBLICATIONS

Dong Zhu, Adarshpal S. Sethi, Pramod Kalyanasundaram, Towards Integrated Network Management Scripting Frameworks, 14 pages.

* cited by examiner

*Primary Examiner* — Firmin Backer
*Assistant Examiner* — Herman Belcher
(74) *Attorney, Agent, or Firm* — Fish & Richardson P.C.

(57) ABSTRACT

In one embodiment, a Management Information Base (MIB) is dynamically loaded on a managed network device that is managed by a managing network device using a management application. Initially, one or more network management objects are identified. The identified one or more network management objects are then included in the MIB. Thereafter, a policy file to be associated with the MIB is defined. Consequently, the MIB is loaded on the managed network device along with the associated policy file.

23 Claims, 4 Drawing Sheets

METHOD AND SYSTEM FOR DYNAMIC LOADING OF MANAGEMENT INFORMATION BASES ON NETWORK DEVICES

BACKGROUND OF THE INVENTION

1. Copyright Notice

In the description herein for embodiments of the present invention, a portion of the disclosure recited in the specification contains material, which is subject to copyright protection. The copyright owner has no objection to the facsimile reproduction of the specification as filed in the Patent and Trademark Office. Otherwise, all copyright rights are reserved.

2. Field of the Invention

Embodiments of the present invention relate, in general, to networking. More specifically, the embodiments of the present invention relate to methods and systems for dynamically loading Management Information Bases (MIBs) on network devices.

3. Description of the Background Art

In a typical network environment, different network devices are connected through network systems. These network systems provide a physical and a logical connection between the network devices. Examples of network systems include, but are not limited to, Local Area Networks (LANs), Wide Area Networks (WANs), Metropolitan Area Networks (MANs), and Personal Area Networks (PANs). Some of these network devices in the network systems are referred to as managing network devices and others are referred to as managed network devices.

The managing network devices can be Network Management Systems (NMSs) that observe and control processing of the managed network devices. Examples of the managed network devices include, but are not limited to, hosts, servers, routers, and intelligent repeaters. The managing network devices and the managed network devices adhere to a common framework called the Internet Management Framework (IMF). The IMF and the network devices abide by a common set of rules, referred to as protocol, for communication. Examples of protocol include, but are not limited to, Simple Network Management Protocol (SNMP), Common Management Information Protocol (CMIP), and Common Management information protocol over Transmission control protocol (CMOT).

A managed network device collects and stores management information using a network management software module. The network management software module collects the management information and makes it available to a managing network device. The management information is represented by various variables. These variables are network management objects. Examples of network management objects can be the number of bytes transmitted to and by the managed network device, the number of broadcast messages sent and received. In an existing technology, the network management objects are stored in a Management Information Base (MIB) in the managed network device. Therefore, the MIB is a database and a set of specifications of the managed network devices.

Any managed network device includes a defined set of MIBs. The network management objects that are handled by a particular MIB are also fixed. The managing network device can obtain information regarding a network management object by querying an MIB. However, if the queried network management object is not handled by the MIB, no information can be obtained.

According to conventional methods, various other management interfaces existing on the managed network device, are used for handling the queries that are not handled by the MIBs. Examples of such existing management interfaces include, but are not limited to, Command Line Interface (CLI), Simple Network Management Protocol (SNMP), eXtensible Markup Language (XML) and Hyper Text Transfer Protocol (HTTP). These existing management interfaces expose the management information of the managed network device. The same management information is exposed through more than one interface in case of an over-lapping. On the contrary, the management information is exposed through one existing management interface and not through another existing management interface in case of under-lapping.

In case of under-lapping, the management information is extracted from the existing management interface which exposes the management information. A user must be available to extract the information by querying the existing management interface. Typically, however, the information extracted from the existing management interface has a syntax that is different from the one used by the managing network device. Therefore, adapting the syntax of the information extracted from the existing management interface for use by the managing network device presents a lot of complications in the programmatic environment of the managing network device. Also, the conversion of information into necessary syntax is a very complicated process.

In view of the problems arising due to the acquiring of extracted information, a new MIB is required to be generated, to provide the management information to the managing network device. Network administrators request a network device vendor to add support for the new MIB. Thereafter, the new MIB is generated and added by software upgrade provided by the network device vendor.

However, generating a new MIB involves a long design and development cycle. As a result, generating the new MIB is a complex and time-consuming procedure, which can take several months or even years. Therefore, there is a need for a method and system for creating dynamic MIBs that are mapped to the existing management interfaces.

DETAILED DESCRIPTION OF EMBODIMENTS OF THE INVENTION

Figure 1:
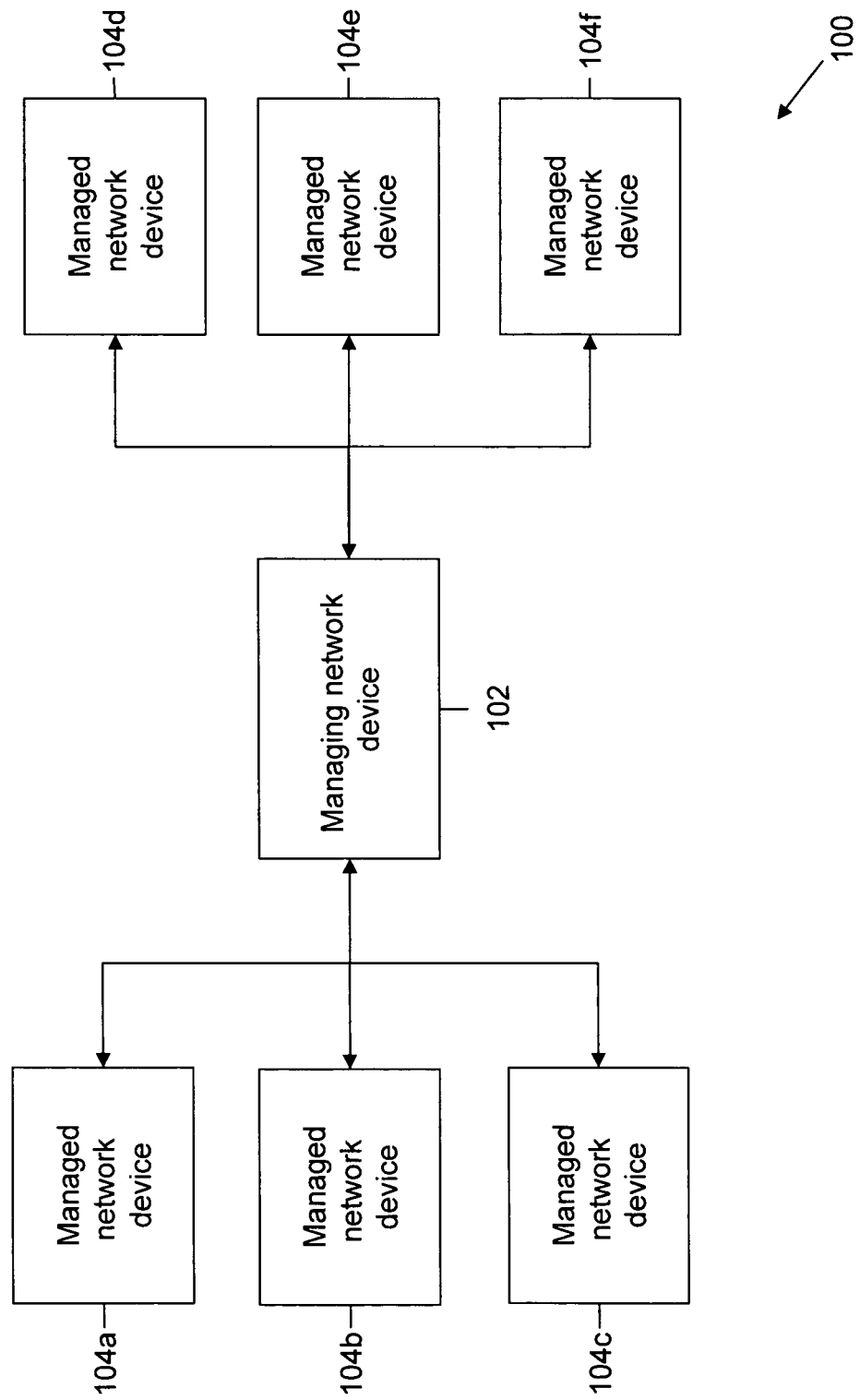
FIG. 1 illustrates a network environment wherein various embodiments of the present invention can be implemented.

Embodiments of the invention provide methods and systems for dynamically loading a Management Information Base (MIB) on a managed network device. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatuses, systems, assemblies, methods, components, materials, parts, and the like. In other instances, well-known structures, materials or operations are not specifically shown or described in detail to avoid obscuring aspects of embodiments of the present invention.

In a typical network environment, various network devices are connected through network systems. Some of these network devices in the network systems are managing network devices and others are managed network devices. The managing network devices can be a Network Management Systems (NMSs) that observe and control the processing of the managed network devices. The managing network device and the managed network devices adhere to a common framework called the Internet Management Framework (IMF). The IMF and the network devices abide by a common set of rules for communication, which is referred to as a protocol. Examples of the protocol include, but are not limited to, Simple Network Management Protocol (SNMP), Common Management Information Protocol (CMIP), Common Management information protocol Over Transmission control protocol (CMOT), and Simple Object Access Protocol (SOAP).

A managed network device collects and stores management information using a network management software module. The network management software module collects the management information and makes it available to the managing network device. The management information is represented by various variables. These variables are network management objects. Examples of network management objects can be the number of bytes transmitted to and transmitted by the managed network device, the number of broadcast messages sent and received. Therefore, the MIB is a database and a set of specifications in a framework referred to as Structure of Management Information (SMI). The SMI is a framework that describes the basic type of information regarding the network management objects. In addition, the SMI provides basic format and hierarchy of the management information. The SMI does not describe the network management objects. However, the SMI describes the management information that acts as the building blocks on the basis of which the network management objects are constructed. The MIB in the managed network device can be directly queried by the managing network device.

Any managed network device includes a defined set of MIBs provided by a network device vendor. The network management objects that are handled by a particular MIB are also fixed. The managing network device can obtain value of a network management object by querying an MIB. However, if the queried network management object is not handled by the particular MIB, no value is obtained. However, the value of the network management object that is not handled by the MIB is available on other existing management interfaces. Examples of such existing management interfaces include, but are not limited to, Command Line Interface (CLI), Simple Network Management Protocol (SNMP), eXtensible Markup Language (XML) and Hyper Text Transfer Protocol (HTTP). The availability of the value of the network management object in an existing management interface and not in the MIB is called under-lapping.

The present invention provides a method for defining an MIB on a managed network device. The MIB is a database and a set of specifications of network managed objects. This MIB includes network management objects, the values of which are available in the existing management interface. Values of the network management objects included in this defined MIB are not available in an existing MIB on the managed network device or in an SNMP interface. Initially, the network management objects are identified, and then they are included in the MIB. The MIB is then loaded on the managed network device along with an associated policy file. The policy file includes policies that are used for obtaining the values of the network management objects from the existing management interface. Moreover, these policies are defined by a user. The user defines the policy file outside the MIB. Therefore, the policy file is not a part of the Operating System (OS) of the managed network device.

On receiving a query from a managing network device, the policies included in the policy file are triggered. Thereafter, the policy file obtains values of the network management object included in the MIB from the existing management interface. The values obtained are then populated in the MIB. Consequently, the managing network device can obtain a value of a network management object by querying the MIB. The MIB provides the value of the network management object to the managing network device by extracting the value from the existing management interface.

In accordance with an embodiment of the present invention, the MIB is loaded on the managed network device along with the policy file.

In accordance with another embodiment of the present invention, the MIB is loaded on another managing network device and is associated with another policy file. The another policy file obtains the values of the network management object from existing management interface on the another managed network device and populates the MIB. The association of the another policy file makes the MIB independent of the existing management interface used for obtaining the values of the network management object.

Referring now to the drawings, particularly by their reference numbers, FIG. 1 illustrates a network 100, wherein various embodiments of the present invention can be implemented. The illustrated network 100 includes a managing network device 102 and managed network devices 104.

Examples of network 100 include, but are not limited to, Local Area Networks (LANs), Wide Area Networks (WANs), Metropolitan Area Networks (MANs), and Personal Area Networks (PANs). Network 100 may provide a physical or logical connection among managing network device 102 and managed network devices 104. For example, network 100 can implement this connection as a private leased line, a frame-relay circuit, a Virtual Private Network (VPN), and so forth. Managing network device 102 and managed network devices 104 are connected by network 100 in various network topologies. Examples of the network topologies include mesh, star, ring, and bus topologies.

Managing network device 102 can be an NMS that observes and controls the processing of managed network devices 104 by executing a management application. The management application uses a network management software module that observes and controls the processing of managed network devices 104. The network management software module obtains management information and makes it available to managing network device 102 for observing and controlling processing of managed network devices 104. Thereafter, managing network device 102 executes the management application in order to observe and control managed network devices 104. Managed network devices 104 are, for example, personal computers, hosts, servers, notebooks, Wireless Fidelity (WiFi) devices, mobile phones, Personal Digital Assistants (PDAs) and other such network devices. Managed network devices 104 include managed network devices 104a, 104b, 104c, 104d, 104e, and 104f. It is to be understood that the specific network configuration is for the reader's convenience and is not to be construed as limiting managing network device 102 to a specific number of managed network devices 104 or to specific types of managed network devices present in network 100.

Figure 2:
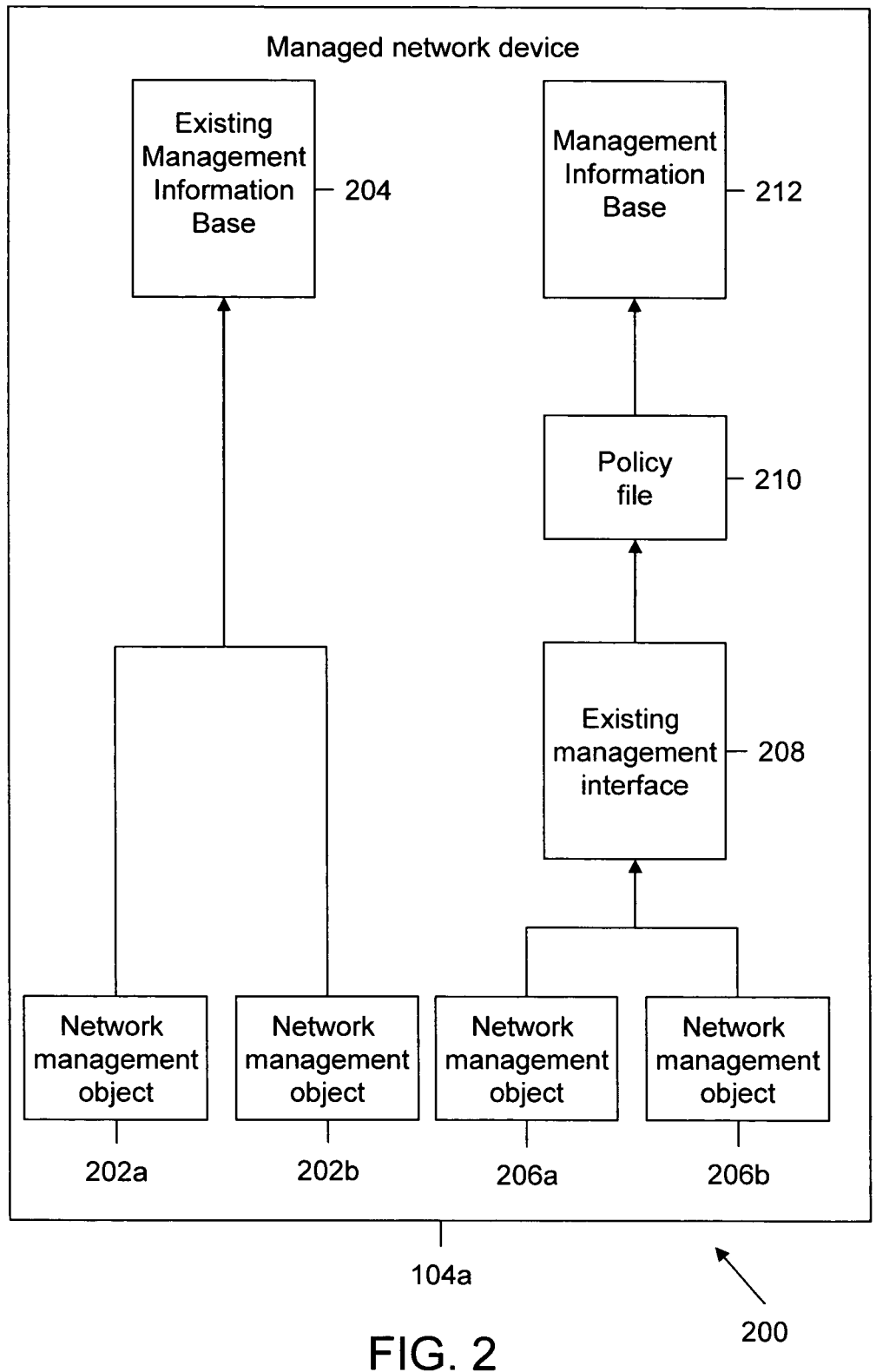
FIG. 2 illustrates various elements of a system for dynamically loading a Management Information Base (MIB) on a managed network device, in accordance with an embodiment of the present invention.

FIG. 2 illustrates various elements of system 200 for dynamically loading an MIB on managed network device 104a, in accordance with an embodiment of the present invention. System 200 includes managed network device 104a that further includes network management objects 202, an existing MIB 204, network management objects 206, an existing management interface 208, policy file 210, and an MIB 212.

Network management objects 202 and 206 include network management objects 202a, 202b, and 206a, 206b, respectively. It is to be understood that the specific system configuration is for the reader's convenience and is not to be construed as limiting system 200 to a specific number of network management objects 202 and 206 or to specific types of network management objects present in system 200. Network management objects 202 and 206 are variables. Values of these variables represent management information in managed network device 104a. Moreover, the values of these variables also represent the management status in managed network device 104a. Examples of network management objects have been mentioned above.

In managed network device 104a, values of network management objects 202a and 202b are available in existing MIB 204. Existing MIB 204 is a database and a set of specifications capable of providing values of network management objects 202 included in it.

However, values of network management objects 206 are not available in existing MIB 204 as network management objects 206 are not included in existing MIB 204. If managing network device 102 requires the values of network management objects 202, the values are obtained by querying existing MIB 204. If managing network device 102 requires the values of network management objects 206, the values can not be obtained by querying existing MIB 204. Instead, the values of network management objects 206 are available in existing management interface 208. Examples of existing management interface 208 have been mentioned above. The availability of the values of network management objects 206 in existing management interface 208 and non-availability in existing MIB 204 is known as under-lapping.

The values of network management objects 202 that are obtained by querying existing MIB 204 are formal specifications of management information. The values of network management objects 202 are provided by existing MIB 204 in a syntax that can be used directly by the management application in managing network device 102. This syntax is compatible with the management application. Moreover, the syntax of the values of network management objects 202 provided by existing MIB 204 are defined in same formal specification of management information, which can be used for modeling the management information in managed network device 104a. Subsequently, the same syntax is used as syntax for queries of managing network device 102.

However, the values of network management objects 206 that are obtained from existing management interface 208 are informal specifications of the management information in informal formats such as, text format and string format. Therefore, the values of network management objects 206 that are obtained from existing management interface 208 cannot be used directly by the management application. The management application has to convert the informal specifications to formal specifications before using the values of network management objects 206. However, this conversion is a complex procedure.

In accordance with an embodiment of the present invention, an exemplary complex procedure has been described below:
Example Command: sh interfaces ethernet 3/0
Example output:
Ethernet3/0 is up, line protocol is up
Hardware is AmdP2, address is 0001.975f.a454 (bia 0001.975f.a454)
Internet address is 9.9.3.5/16
MTU 1500 bytes, BW 10000 Kbit, DLY 1000 usec,
reliability 255/255, txload 1/255, rxload 1/255
Encapsulation ARPA, loopback not set
Keepalive set (10 sec)
ARP type: ARPA, ARP Timeout 04:00:00
Last input 00:00:00, output 00:00:09, output hang never
Last clearing of "show interface" counters never
Input queue: 0/75/0/0 (size/max/drops/flushes); Total output drops: 0
Queuing strategy: fifo
Output queue: 0/40 (size/max)
5 minute input rate 0 bits/sec, 0 packets/sec
5 minute output rate 0 bits/sec, 0 packets/sec
67714 packets input, 7820179 bytes, 0 no buffer
   Received 67606 broadcasts, 0 runts, 0 giants, 0 throttles
   0 input errors, 0 CRC, 0 frame, 0 overrun, 0 ignored
   0 input packets with dribble condition detected
   20542 packets output, 2456045 bytes, 0 underruns
   0 output errors, 6 collisions, 2 interface resets
   0 babbles, 0 late collision, 13 deferred
   0 lost carrier, 0 no carrier
   0 output buffer failures, 0 output buffers swapped out Values of exemplary network management objects are obtained in a free format text. Therefore, the values of the exemplary network management objects are useful to a user to read and understand. However, for programmatic use, the values of the exemplary network management objects are required to be converted from the free-format text to variables and their values. Complex rules are required to convert the free-format text to variable value pair. The rules scans line numbers in the free format text to look for particular patterns and delimiters. On encountering required particular patterns and required delimiters, the rules convert the numbers represented as free format text into values corresponding to the variables. For example, if value of 'packets inputs' is required the following steps are performed; Initially a variable 'packin' is defined. Value of the variable 'packin' represents the value of 'packets inputs'. Thereafter, the following steps are performed:
1) Goto line #16 in the output of the command
2) Look for a string match "packets input"
3) Read the string preceding it by a space "67714"
4) Convert this string to an integer 67714

The above mentioned procedure is complicated as the free format text is not formally defined. Moreover, the free format text varies from one managed network device to another managed network device. This further increases the complexity, requiring multiple rules for multiple managed network devices.

In order to obtain the values of network management objects 206 as formal specifications, network management objects 206 are required to be included in existing MIB 204. However, modifying existing MIB 204 in order to include network management objects 206, is a complex and time-consuming procedure that can only be provided by the network device vendor. Moreover, generating a new MIB that will include network management objects 202a, 202b, 206a, and 206b is also a complex and time-consuming procedure that can only be provided by the network device vendor. The modified existing MIB 204 or new MIB provided by the network device vendor is a software upgrade. This software upgrade is required to be tested before using it in managed network device 104a. This involves a long cycle of designing and developing. As a result, modifying existing MIB 204 or generating the new MIB can consume several months or even years.

However, the values of network management objects 206 that are obtained from existing management interface 208 are extracted by policy file 210. Policy file 210 starts the process of extraction on receiving a query from managing network device 102. Policy file 210, after extracting the values of network management objects 206, converts the existing syntax of the extracted values to another syntax that is compatible with the management application. Thereafter, policy file 210 populates MIB 212 with the extracted and converted values of network management objects 206. As a result, the informal specifications provided by existing management interface 208 are now available as formal specifications that are used directly by the management application.

In accordance with an embodiment of the present invention, policy file 210 and MIB 212 are dynamically loaded on managed network device 104a during the run-time of managed network device 104a. The process of generating and loading MIB 212 is a simple procedure as policy file 210 is not a part of the OS of managed network device 104a. Therefore, MIB 212 and policy file 210 can be loaded on managed network device 104a without upgrading the existing OS of managed network device 104a. As a result, managed network device 104a is not required to be taken out of network 100 for the purpose of upgrading. This saves on the planning requirement and the time consumed. Moreover, the present invention provides a process for implementing an infrastructure for loading MIB 212 and policy file 210 on managed network device 104a. This infrastructure is a software model which helps managed network device 104a to associate MIB 212 with corresponding policy file 210. Therefore, generating and loading MIB 212 becomes simpler due to the presence of the infrastructure in managed network device 104a and can be easily practiced.

As a result, MIB 212 is generated and loaded dynamically by mapping MIB 212 to existing management interface 208. MIB 212 is mapped by policy file 210. On receiving a query from managing network device 102, policy file 210 maps MIB 212 by populating the extracted and converted values of network management objects 206 in MIB 212.

Figure 3:
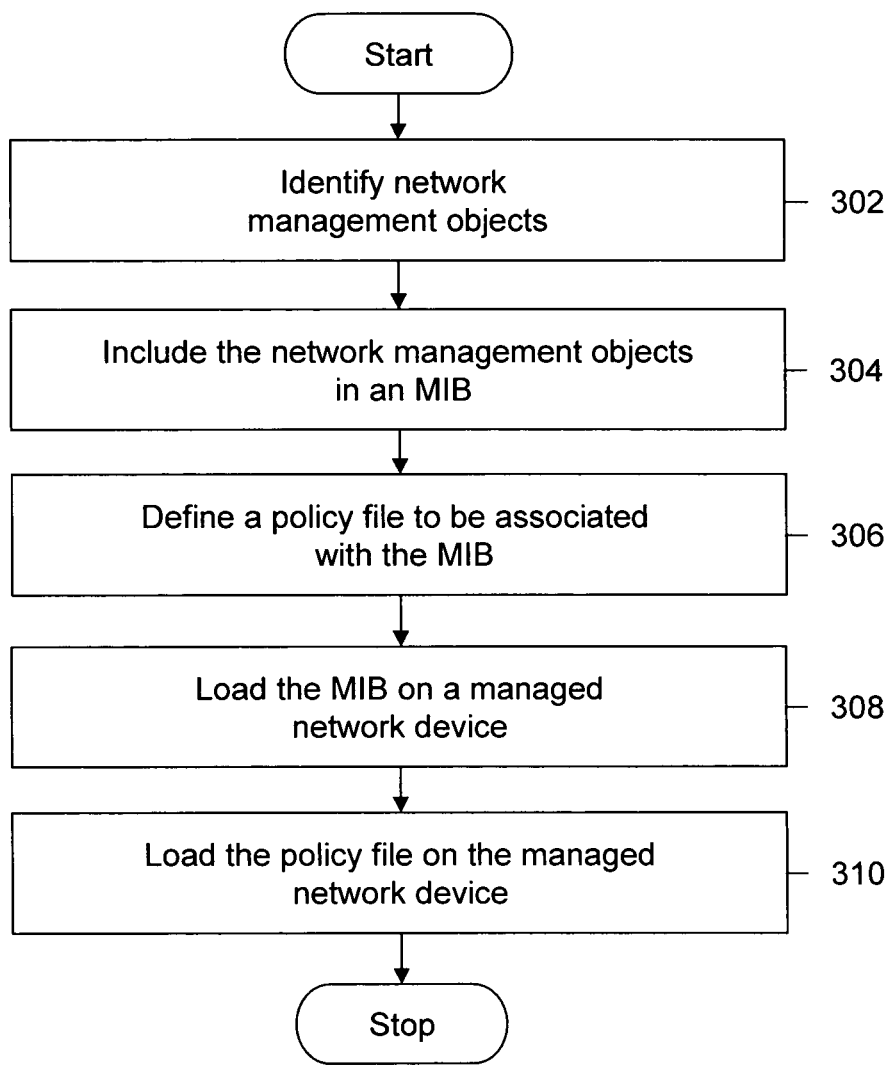
FIG. 3 is a flow diagram illustrating a method for dynamically loading an MIB on a managed network device in accordance with an embodiment of the present invention.

FIG. 3 is a flow diagram illustrating a method for dynamically loading MIB 212 on managed network device 104a, in accordance with an embodiment of the present invention. At 302, a user identifies network management objects 206 that are not included in existing MIB 204. Therefore, existing MIB 204 cannot provide the values of network management objects 206. At 304, the user includes the identified network management objects 206 in MIB 212. At 306, policy file 210 to be associated with MIB 212 is defined by the user on the basis of network management objects 206 available in existing management interface 208.

At 308, MIB 212 is loaded on managed network device 104a using the infrastructure. MIB 212 is defined by an MIB definition. This MIB definition can be parsed to form MIB structure in managed network device 104a. In accordance with an embodiment of the present invention, MIB 212 is loaded on managed network device 104a during the run-time.

Thereafter, at 310, the infrastructure loads policy file 210 on managed network device 104a. Subsequently, the infrastructure associates MIB 212 with policy file 210. Therefore, policy file 210 that is associated with MIB 212 is required to be loaded on managed network device 104a along with MIB 212. MIB 212 is a regular MIB and can be subsequently used as any other standard or proprietary MIB that is exposed by managed network device 104a.

However, policy file 210 is not a part of the OS of managed network device 104a. Therefore, MIB 212 and policy file 210 can be loaded on managed network device 104a without upgrading the existing OS of managed network device 104a. Consequently, more flexibility is added to the procedure provided in the present invention.

In an embodiment of the present embodiment, MIB 212 and policy file 210 can be loaded on any managed network devices 104b, 104c, 104d, 104e, and 104f using the infrastructure. Thereafter, one or more of managed network devices 104b, 104c, 104d, 104e, and 104f on which MIB 212 and policy file 210 are loaded can use MIB 212 as any other standard or proprietary MIB that is exposed by one or more of managed network devices 104b, 104c, 104d, 104e, and 104f. Policy file 210 is not a part of the OS of one or more of managed network devices 104b, 104c, 104d, 104e, and 104. Therefore, MIB 212 and policy file 210 are loaded on one or more of managed network devices 104b, 104c, 104d, 104e, and 104f without upgrading the existing OS of one or more of managed network devices 104b, 104c, 104d, 104e, and 104f.

In another embodiment of the present invention, MIB 212 can be loaded on any managed network devices 104b, 104c, 104d, 104e, and 104f and is associated with another policy file. The another policy file is also defined by the user according to existing management interface on one or more of managed network devices 104b, 104c, 104d, 104e, and 104f. The association of the another policy file makes MIB 212 independent of existing management interface used for obtaining the values of network management object 206a and 206b from one or more of managed network devices 104b, 104c, 104d, 104e, and 104f on which MIB 212 is loaded. Thereafter, one or more of managed network devices 104b, 104c, 104d, 104e, and 104f on which MIB 212 and the another policy file are loaded can use MIB 212 as any other standard or proprietary MIB that is exposed by one or more of managed network devices 104b, 104c, 104d, 104e, and 104f.

In various embodiments of the present invention, MIB 212 is assigned an MIB name. The MIB name uniquely identifies MIB 212 in network 100. MIB 212 is represented by the same MIB name in all managed network devices 104 on which it is loaded.

Figure 4:
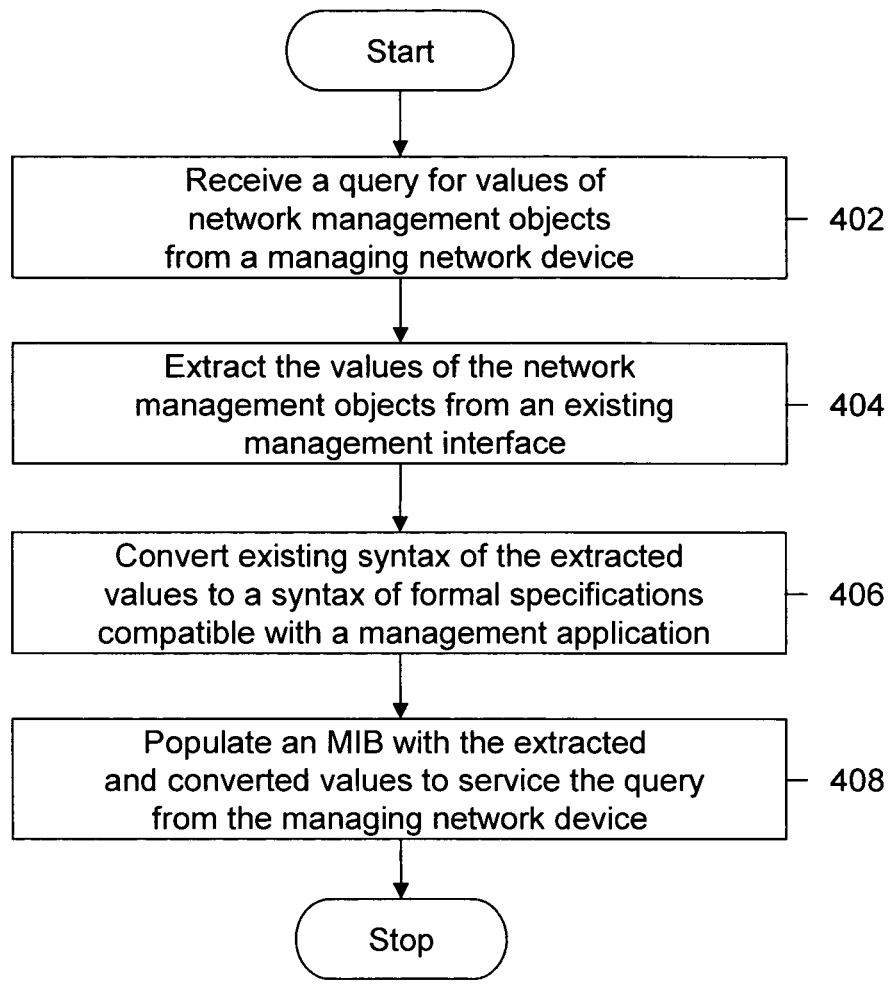
FIG. 4 is a flow diagram illustrating a method for populating the MIB on a managed network device in accordance with an embodiment of the present invention.

FIG. 4 is a flow diagram illustrating a method for populating MIB 212 on managed network device 104a, in accordance with an embodiment of the present invention. At 402, on receiving a query from managing network device 102, policy file 210 extracts values of network management objects 206 that are now included in MIB 212. Thereafter, at 304, policy file 210 converts the values of network management objects 206 from the existing syntax of the extracted values to another syntax of formal specifications that is compatible with the management application. The syntax of the values is converted in order to convert the informal specifications provided by the values into the formal specifications that can be directly used by the management application in managing network device 102. At 308, the extracted and the converted values of network management objects 206 are populated in MIB 212. The values of network management objects 206 are obtained by the management application directly from the queried MIB 212.

Populating MIB 212 is a flexible process as network management objects 206 included in MIB 212 are identified by the user. Moreover, policy file 210 used for populating MIB 212, include policies that are also defined by the user. Therefore, policy file 210 that populates MIB 212 are defined and can be used as per the user's requirement. Consequently, more flexibility is added to the procedure provided in accordance with the present invention.

In accordance with an embodiment of the present invention, on receiving a query from managing network device 102, policy file 210 extracts and converts the values of network management objects 206, and populates the extracted and converted values in an output table included in MIB 212. As a result, the management application obtains the values of network management objects 206 directly from the output table of queried MIB 212. The values obtained are in a syntax of formal specifications that is compatible with the management application and can be used directly by the management application in managing network device 102.

In accordance with an embodiment of the present invention, an exemplary MIB definition has been described below:

```
SAMPLE-MIB DEFINITIONS ::= BEGIN
IMPORTS
   MODULE-IDENTITY, OBJECT-TYPE,
   Integer32
      FROM SNMPv2-SMI
   MODULE-COMPLIANCE, OBJECT-GROUP
      FROM SNMPv2-CONF
   mib-2, ifIndex
      FROM IF-MIB
   ciscoExperiment
         FROM CISCO-SMI;
sampleMIB MODULE-IDENTITY
LAST-UPDATED "YYYYMMDD0000Z"
ORGANIZATION "Cisco Systems, Inc."
CONTACT-INFO " "
DESCRIPTION
      "This MIB is user defined."
::= { ciscoExperiment 999 }
sampleMIBObj OBJECT IDENTIFIER ::= { sampleMIB 1 }
sampleIfRateTable OBJECT-TYPE
SYNTAX SEQUENCE OF ifRateEntry
MAX-ACCESS not-accessible
STATUS current
DESCRIPTION "Table to store 5 minute input and
      output rate for interfaces"
::= {sampleMIBObj 1 }
ifRateEntry OBJECT-TYPE
SYNTAX IfRateEntry
MAX-ACCESS not-accessible
STATUS current
DESCRIPTION "A list of values for interfaces"
INDEX { ifIndex }
::= { ifRateTable 1 }
IfRateEntry ::= SEQUENCE
{
   ifRateInputRate,
   ifRateOutputRate
}
ifRateInputRate OBJECT-TYPE
SYNTAX      Integer32
MAX-ACCESS      read-only
STATUS      current
DESCRIPTION      "maps to the input-rate parameter in
      show interface command. Unit is bit/sec"
::= { ifRateEntry 1 }
ifRateOutputRate OBJECT-TYPE
SYNTAX      Integer32
MAX-ACCESS      read-only
STATUS      current
```

```
DESCRIPTION "maps to the output-rate parameter in
      show interface command. Unit is bit/sec"
::= { ifRateEntry 2 }
END
```

An exemplary policy file associated with the above-mentioned exemplary MIB definition is described below:

```
<POLICY>
<MIB>SAMPLE-MIB</MIB>
<TABLE>
<NAME>sampleIfRateTable</NAME>
<OID>ciscoExperiment.999.1.1</OID>
<INDEX>
<NAME>ifIndex</NAME>
<INPUT>ifIndex</INPUT> //a ifIndex incase of a get/getnext, NULL
in case of getmany
<METHOD>Callback:getifDescr.ifIndex</METHOD>
<OUTPUT>[descr]</OUTPUT>
</INDEX>
<COLUMNS>
<COLUMN>
<OID>ciscoExperiment.999.1.1.1.1</OID>
<NAME>ifRateInputRate</NAME>
<DATATYPE>%d</DATATYPE>
<INPUT>[descr]</INPUT>
<METHOD>EXEC: sh int INPUT</METHOD>
<FILTER>5 minute input rate</FILTER>
<DELIMITER>" "</DELIMITER>
</COLUMN>
<COLUMN>
<OID>ciscoExperiment.999.1.1.1.2</OID>
<NAME>ifRateOutputRate</NAME>
<DATATYPE>%d</DATATYPE>
<INPUT>[descr]</INPUT>
<METHOD>EXEC: sh int INPUT</METHOD>
<FILTER>5 minute output rate</FILTER>
<DELIMITER>" "</DELIMITER>
</COLUMN>
</COLUMNS>
</TABLE>
</POLICY>
```

On receiving a query from a managing network device, the above-mentioned policy file will populate an exemplary output table present in an exemplary MIB. The exemplary MIB is generated using the exemplary MIB definition mentioned above. The exemplary output table is given below:

| ifIndex(Imported from IF-MIB) | ifRateInputRate | ifRateOutputRate |
|---|---|---|
| 1 | 200 | 100 |
| 3 | 300 | 200 |

The exemplary output table is created and populated in the exemplary MIB by the exemplary policy file. The exemplary MIB has a unique MIB name that defines OID of the exemplary MIB. Network management objects to be included in the exemplary MIB are ifIndex(Imported from IF-MIB), ifRateInputRate, and ifRateOutputRate. Thereafter, the exemplary policy file extracts values of the above-mentioned network management objects, converts the values to a required syntax, and then populates the values in the exemplary output table in the exemplary MIB. Subsequently, a managing network device can obtain the values of the network management objects by querying the exemplary MIB. The values of the network management objects are used for observing and controlling the managed network device. The values of the network management objects that are obtained from the exemplary output table can then be directly used by the managing network device as formal specifications of management information of the managed network device.

In accordance with various embodiments of the present invention, a system for dynamically loading a MIB on a managed network device that is managed by a managing network device using a management application is provided. The system includes means for identifying one or more network management objects; means for including the one or more network management objects in the MIB; means for defining a policy file to be associated with the MIB; means for loading the MIB on the managed network device; and means for loading the policy file on the managed network device.

According to an embodiment of the present invention, a method for dynamically loading a MIB on a managed network device that is managed by a managing network device using a management application is provided. The method comprises identifying one or more network management objects; including the one or more network management objects in the MIB; defining a policy file to be associated with the MIB; loading the MIB on the managed network device; and loading the policy file on the managed network device.

Various embodiments of the present invention provide a system for dynamically loading a Management Information Base (MIB) on a managed network device that is managed by a managing network device using a management application. The system comprises a management interface; one or more network management objects; a policy file, the policy file defining and populating the MIB; and an infrastructure, the infrastructure dynamically loading the MIB on the managed network device.

Various embodiments of the present invention provide a machine-readable medium that includes instructions for dynamically loading a MIB on a managed network device that is managed by a managing network device by using a management application executable by a processor. One or more of these instructions are for identifying one or more network management objects. Other instructions are for including the one or more network management objects in the MIB. Still other instructions are for defining a policy file to be associated with the MIB. Other instructions are for loading the MIB on the managed network device. Yet other instructions are for loading the policy file on the managed network device.

Various embodiments of the present invention dynamically load MIB 212 in managed network device 104a. MIB 212 is loaded along with policy file 210 that is associated with MIB 212. On receiving a query from managing network device 102, policy file 210 extracts values of network management objects 206 from existing management interface 208. Thereafter, policy file 210 converts the values of network management objects 206 from the existing syntax of the extracted values to another syntax that is compatible with the management application. The syntax of the values is converted in order to make the informal specifications provided by the values to a formal specification that can be directly used by the management application in managing network device 102. The extracted and the converted values of network management objects 206 are populated in MIB 212. The values of network management objects 206 can be obtained by the management application directly from queried MIB 212. Moreover, MIB 212 is also loaded with policy file 210 during the run-time of managed network device 104a. As policy file 210 is not a part of the OS, MIB 212 and policy file 210 are loaded on managed network device 104a without upgrading the existing OS of managed network device 104a. Managed network device 104a is not required to be taken out of network 100 for the purpose of upgrading. This saves a lot of time and planning requirements.

Various embodiments of the present invention populate MIB 212 by mapping MIB 212 to existing management interface 208. MIB 212 is mapped by policy file 210. On receiving a query from managing network device 102, policy file 210 maps MIB 212 by populating the extracted and converted values of network management objects 206 in MIB 212. Populating of MIB 212 is simplified by mapping MIB 212 to existing management interface 208, as compared to existing procedures that are complex and time-consuming which requires a software upgrade provided by a network device vendor. These complex and time-consuming procedures can consume several months or even years.

In accordance with an embodiment of the present invention, MIB 212 and policy file 210 can be loaded or used in one or more of managed network devices 104b, 104c, 104d, 104e, and 104f. As policy file 210 are not a part of the OS, MIB 212 and policy file 210 are loaded on one or more of managed network devices 104b, 104c, 104d, 104e, and 104f without upgrading the existing OS of one or more of managed network devices 104b, 104c, 104d, 104e, and 104f. Therefore, one or more of managed network devices 104b, 104c, 104d, 104e, and 104f are not required to be taken out of network 100 for the purpose of upgrading. This saves lot of time and planning requirements.

Various embodiments of the present invention provide a process for implementing an infrastructure for loading MIB 212 and policy file 210 on managed network device 104a. This infrastructure is a software model which helps managed network device 104a to associate MIB 212 with corresponding policy file 210. Generating and loading MIB 212 becomes a simple procedure due to the presence of the infrastructure in managed network device 104a.

Various embodiments of the present invention provides a flexible method of populating MIB 212, which is a flexible process as network management objects 206 included in MIB 212 are identified by the user.

Although the invention has been discussed with respect to specific embodiments thereof, these embodiments are merely illustrative, and not restrictive, of the present invention. For example, a "method for dynamic loading of management information bases on network devices" can include any type of analysis, manual or automatic, to anticipate the needs of the networks.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiples shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components ors will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Also in the description herein for embodiments of the present invention, a portion of the disclosure recited in the specification may contain material, which is subject to copyright protection. The copyright owner has no objection to the facsimile reproduction of the specification as filed in the Patent and Trademark Office. Otherwise all copyright rights are reserved.

What is claimed is:

1. A method comprising:
   identifying network management objects associated with a managed network device that are available in a first management application in the managed network device, the network management objects not included in an existing management information base (MIB) associated with the managed network device, the first management application configured for handling network management objects that are not included in the existing MIB;
   including the identified network management objects in a new MIB;
   generating a first policy file for association with the new MIB based on the identified network management objects, wherein the first policy file is generated outside the existing MIB and includes policies used for obtaining values of the identified network management objects from the first management application;
   loading the new MIB on the managed network device, including loading the first policy file on the managed network device;
   receiving, at the managed network device, a query from a managing network device for a value of a network management object included in the new MIB; and
   responsive to receiving the query:
     extracting, using the first policy file, the queried value from the first management application;
     converting, using the first policy file, the extracted value to a syntax that is compatible with a second management application associated with the managing network device; and
     populating, using the first policy file, the new MIB with the converted value during runtime of the managed network device.

2. The method of claim 1, wherein an infrastructure implemented on the managed network device loads the new MIB and the first policy file on the managed network device.

3. The method of claim 2, wherein the infrastructure associates the new MIB with the first policy file on the managed network device.

4. The method of claim 1 further comprising selecting the network management objects included in the new MIB as part of a process for loading the new MIB.

5. The method of claim 1 further comprising:
converting an existing syntax of the extracted value to a syntax of formal specifications that is compatible with the second management application; and
using the populated new MIB to service the query from the managing network device.

6. The method of claim 5, wherein the queried value in the converted syntax is obtained by the second management application directly from the new MIB.

7. The method of claim 5, wherein the queried value in the converted syntax is populated in an output table present in the new MIB by the first policy file.

8. The method of claim 1 further comprising:
loading the new MIB on a second managed network device that is different from the managed network device on which the new MIB is previously loaded; and
loading a second policy file on the second managed network device.

9. The method of claim 8 further comprising:
receiving, at the second managed network device, a query from the managing network device for a value of a network management object included in the new MIB loaded on the second managed network device; and
responsive to receiving the query:
extracting, using the second policy file, the queried value from a third management application on the second managed network device, the third management application on the second managed network device configured for handling network management objects that are not included in pre-existing MIBs associated with the second managed network device;
converting, using the second policy file, an existing syntax of the extracted value to a syntax of formal specifications compatible with the second management application;
populating, using the second policy file, the new MIB on the second managed network device with the converted value during runtime; and
using the populated new MIB to service the query from the managing network device.

10. The method of claim 9, wherein the second policy file is different from the first policy file loaded on the managed network device, the first policy file and the second policy file configured for obtaining values of the network management objects included in the new MIB.

11. A system comprising:
one or more processors; and
a non-transitory machine-readable medium including instructions executable by the one or more processors and configured to cause the one or more processors to perform operations comprising:
identifying network management objects associated with a managed network device that are available in a first management application in the managed network device, the network management objects not included in an existing management information base (MIB) associated with the managed network device, the first management application configured for handling network management objects that are not included in the existing MIB;
including the identified network management objects in a new MIB; and
generating a first policy file for association with the new MIB based on the identified network management objects, wherein the first policy file is generated outside the existing MIB and includes policies used for obtaining values of the identified network management objects from the first management application;
loading the new MIB on the managed network device, including loading the first policy file on the managed network device;
receiving, at the managed network device, a query from a managing network device for a value of a network management object included in the new MIB; and
responsive to receiving the query:
extracting, using the first policy file, the queried value from the first management application;
converting, using the first policy file, the extracted value to a syntax that is compatible with a second management application associated with the managing network device; and
populating, using the first policy file, the new MIB with the converted value during runtime of the managed network device.

12. A computer system comprising:
first instructions stored in a first non-transitory machine-readable medium for execution by a first processor and configured to cause the first processor to perform operations comprising:
providing for identification, using a first management application in a managed network device, network management objects associated with the managed network device that are not included in an existing management information base (MIB) associated with the managed network device, the first management application configured for handling network management objects that are not included in the existing MIB;
including the identified network management objects in a new MIB; and
generating a first policy file for association with the new MIB based on the identified network management objects, wherein the first policy file is generated outside the existing MIB and includes policies used for obtaining values of the identified network management objects from the first management application;
means for loading the new MIB on the managed network device, including loading the first policy file on the managed network device; and
second instructions stored in a second non-transitory machine-readable medium for execution by a second processor and configured to cause the second processor to perform operations comprising:
receiving, at the managed network device, a query from a managing network device for a value of a network management object included in the new MIB; and
responsive to receiving the query:
extracting, using the first policy file, the queried value from the first management application;
converting, using the first policy file, the extracted value to a syntax that is compatible with a second management application associated with the managing network device; and
populating, using the first policy file, the new MIB with the converted value during runtime of the managed network device.

13. The computer system of claim 12 further comprising second instructions stored in the second non-transitory machine-readable medium for execution by the second processor and configured to cause the second processor to perform operations comprising:

converting an existing syntax of the extracted value to a syntax of formal specifications compatible with the second management application; and using the populated new MIB to service the query from the managing network device.

14. A computer program product, embodied in a non-transitory machine-readable storage medium including instructions executable by a processor and configured to cause the processor to perform operations comprising:

identifying network management objects associated with a managed network device that are available in a first management application in the managed network device, the network management objects not included in an existing management information base (MIB) associated with the managed network device, the first management application configured for handling network management objects that are not included in the existing MIB;

including the identified network management objects in a new MIB;

generating a first policy file for association with the new MIB based on the identified network management objects, wherein the first policy file is generated outside the existing MIB and includes policies used for obtaining values of the identified network management objects from the first management application;

loading the new MIB on the managed network device, including loading the first policy file on the managed network device;

receiving, at the managed network device, a query from a managing network device for a value of a network management object included in the new MIB; and responsive to receiving the query:

extracting, using the first policy file, the queried value from the first management application;

converting, using the first policy file, the extracted value to a syntax that is compatible with a second management application associated with the managing network device; and populating, using the first policy file, the new MIB with the converted value during runtime of the managed network device.

15. The computer program product of claim 14, wherein identification of network management objects and generating the associated first policy file are user-defined.

16. In a network, a managed network device adapted to perform operations comprising:

identifying network management objects associated with a managed network device that are available in a first management application in the managed network device, the network management objects not included in an existing management information base (MIB) associated with the managed network device, the first management application configured for handling network management objects that are not included in the existing MIB;

including the identified network management objects in a new MIB;

generating a first policy file for association with the new MIB based on the identified network management objects, wherein the first policy file is generated outside the existing MIB and includes policies used for obtaining values of the identified network management objects from the first management application;

loading the new MIB on the managed network device, including loading the first policy file on the managed network device;

receiving, at the managed network device, a query from a managing network device for a value of a network management object included in the new MIB; and responsive to receiving the query:

extracting, using the first policy file, the queried value from the first management application;

converting, using the first policy file, the extracted value to a syntax that is compatible with a second management application associated with the managing network device; and populating, using the first policy file, the new MIB with the converted value during runtime of the managed network device.

17. The managed network device of claim 16 wherein the network management objects are user-defined.

18. The system of claim 11, wherein the first management application is selected from the group consisting of a Command Line Interface (CLI), Simple Network Management Protocol (SNMP), eXtensible Markup Language (XML) and Hyper Text Transfer Protocol (HTTP).

19. The computer program product of claim 14, wherein the first management application is selected from the group consisting of a Command Line Interface (CLI), Simple Network Management Protocol (SNMP), eXtensible Markup Language (XML) and Hyper Text Transfer Protocol (HTTP).

20. The managed network device of claim 16, wherein the first management application is selected from the group consisting of a Command Line Interface (CLI), Simple Network Management Protocol (SNMP), eXtensible Markup Language (XML) and Hyper Text Transfer Protocol (HTTP).

21. The method of claim 1, wherein the first management application is selected from the group consisting of a Command Line Interface (CLI), Simple Network Management Protocol (SNMP), eXtensible Markup Language (XML) and Hyper Text Transfer Protocol (HTTP).

22. The method of claim 1, wherein the second management application is selected from the group consisting of Simple Network Management Protocol (SNMP), Common Management Information Protocol (CMIP), Common Management information protocol Over Transmission control protocol (CMOT), and Simple Object Access Protocol (SOAP).

23. The system of claim 11, wherein the second management application is selected from the group consisting of Simple Network Management Protocol (SNMP), Common Management Information Protocol (CMIP), Common Management information protocol Over Transmission control protocol (CMOT), and Simple Object Access Protocol (SOAP).

* * * * *